US012663570B2

(12) United States Patent     (10) Patent No.:   US 12,663,570 B2

Ooi et al.     (45) Date of Patent:    Jun. 23, 2026

(54) SYSTEM AND METHOD TO ELIMINATE INCIDENT LIGHT REFLECTION FROM DISPLAYS IN CAMERAS

(71) Applicant: Dell Products L.P., Round Rock, TX (US)

(72) Inventors: Ghee Beng Ooi, Singapore (SG); Chih-Hao Kao, Singapore (SG); Tiak Hooy Sim, Singapore (SG)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 18/381,287

(22) Filed: Oct. 18, 2023

(65) Prior Publication Data

US 2025/0130358 A1     Apr. 24, 2025

(51) Int. Cl.
| | |
|---|---|
| *G02B 5/30* | (2006.01) |
| *G02F 1/1335* | (2006.01) |
| *G03B 7/18* | (2021.01) |

(52) U.S. Cl.
CPC ..... *G02B 5/3025* (2013.01); *G02F 1/133528* (2013.01); *G03B 7/18* (2013.01)

(58) Field of Classification Search
CPC .... G02B 5/3025; G02F 1/133528; G03B 7/18
See application file for complete search history.

(56) References Cited

U.S. PATENT DOCUMENTS

2024/0292078 A1 * 8/2024 Al-Husseini ......... G02B 27/281

* cited by examiner

*Primary Examiner* — Phu Vu
(74) *Attorney, Agent, or Firm* — Terrile, Cannatti & Chambers, LLP; Emmanuel A. Rivera

(57) ABSTRACT

Described are systems and methods to eliminate reflection from a display's incident light that is captured by a camera, such as a webcam. The display includes a polarizer that polarizes light which is reflected by a medium such as glass to the camera. The reflected light includes linearly polarized light. A polarizer is strategically placed in front of the lens set of a camera. Utilizing an orientation perpendicular to the reflected incident light, reflection from the reflective surfaces is eliminated before it enters the lens set of the camera.

20 Claims, 7 Drawing Sheets

| Backlight Unit | Polarizer | TFT Array | Liquid Crystal | Color Filter | Polarizer |
|:---:|:---:|:---:|:---:|:---:|:---:|
| 304 | 306 | 308 | 310 | 312 | 300 |

302

SYSTEM AND METHOD TO ELIMINATE INCIDENT LIGHT REFLECTION FROM DISPLAYS IN CAMERAS

BACKGROUND OF THE INVENTION

Field of the Invention

The present invention relates to information handling systems. More specifically, embodiments of the invention provide for eliminating reflection on reflective surfaces, such as a user's eyeglasses, where such reflections are from the display's incident light onto the eye glasses captured by cameras or webcams of information handling systems.

Description of the Related Art

As the value and use of information continues to increase, individuals and businesses seek additional ways to process and store information. One option available to users is information handling systems or IHS. Information handling systems include personal computers (PC), server computers, desktop computers, notebooks, laptops, etc. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems (IHS) may include a variety of hardware and software components that may be configured to process, store, and communicate information and may include one or more computer systems, data storage systems, and networking systems.

Information handling systems (IHS), such as desktop computers, laptop/notebook computers, tablets, smartphones, etc. can include a display, such as an external monitor, or built in screen. In addition, an IHS can include an external or built camera or webcam. The display projects light which can be reflected from surfaces, such as eyewear of a user in front of the display. Such reflected light is received by the camera or webcam. This effect can be seen as unwanted and distractive reflection, which is seen as unwanted artifacts on the display, of the user's eyewear or other reflected surface. This can be exacerbated in low light conditions, where such reflection can be more prominent. Such reflection can be particularly annoying and distracting during teleconference or virtual meetings between the user and other attendees. Therefore, there is a desire to eliminate such reflection.

SUMMARY OF THE INVENTION

An information handling system (IHS) comprising a display that includes a stack-up of layers, wherein a top layer is a polarizer from which light is transmitted from the display; and a camera that receives incident light, including linearly polarized light, from the light transmitted from the display, that includes a polarizer that is 90 degrees or perpendicular in polarity to the polarizer of the display, that cancels the linearly polarized light.

A camera connected to an information handling system (IHS) comprising a lens; a polarizer placed in front of the lens to receive incident light transmitted that includes linearly polarized light, from a display that comprises a top layer polarizer from which the light is polarized, wherein the polarizer is 90 degrees or perpendicular in polarity to the top layer polarizer, the polarizer cancels linearly polarized light.

A computer-implementable method for eliminating reflection from incident light captured by an information handling system (IHS) camera comprising determining polarity of a polarizer which polarizes transmitted light from a display connected to the IHS; providing a polarizer in front of the camera that is 90 degrees or perpendicular to the polarity of the polarizer which polarizes transmitted light from the display; receiving by the polarizer in front of the camera, reflected linearly polarized incident light and diffused incident light; processing the reflected linearly polarized incident light and diffused non-polarized incident light to generate images on the display.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
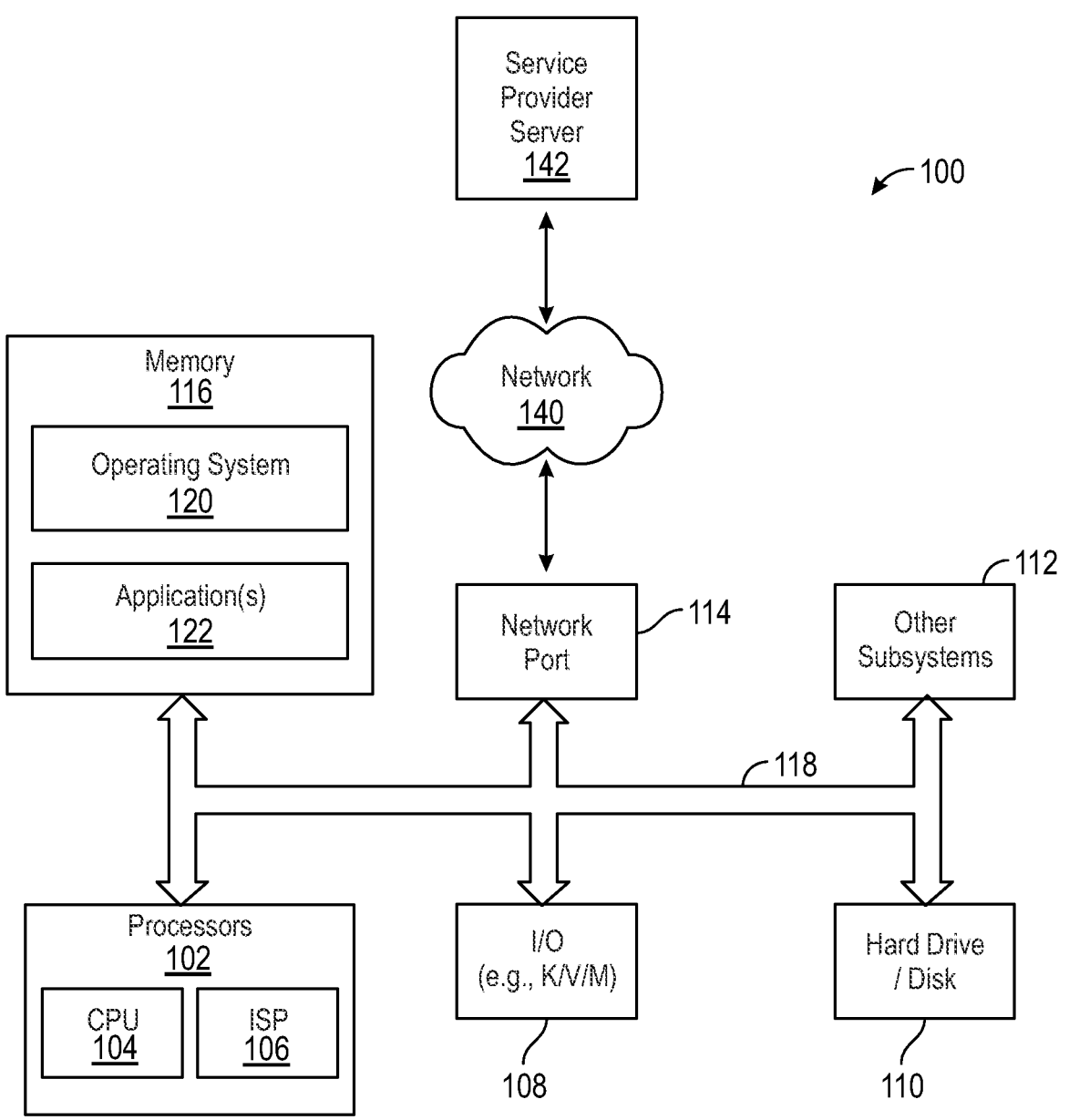
FIG. 1 is a general illustration of components of an information handling system as implemented in the present invention.

FIG. 1 is a generalized illustration of an information handling system 100. The information handling system 100 can be implemented as a computer, such as a desktop, server, tablet, laptop, or notebook, smartphone with built in camera and display, etc. The information handling system 100 includes processor(s) 102, such as a central processor unit or "CPU" 104 and an image signal processor or "ISP" 106. The information handling system 100 further includes input/ output (I/O) devices 108, such as a microphone, a keyboard, a video/display, a mouse, and associated controllers (e.g., K/V/M), a hard drive or disk storage 110, and various other subsystems 112.

Various implementations provide for the I/O devices 108 to be external peripheral devices, such as keyboards, web-cams, monitors, displays, etc. In particular, I/O devices 108 can include cameras, such as webcams, as further described herein.

Implementations provide for such external devices are connected using cables based on standards such as universal serial bus (USB), including USB Type C. In certain, imple-mentations, cameras, such web cameras described herein are external devices that are connected by the cables implement-ing standards, such as USB. Webcam can be the internal device as well such as embedded into a display or laptop.

In various embodiments, the information handling system 100 also includes network port 114 operable to connect to a network 140, where network 140 can include one or more wired and wireless networks, including the Internet. Net-work 140 is likewise accessible by a service provider server 142. The information handling system 100 likewise includes system memory 116, which is interconnected to the forego-ing via one or more buses 118. System memory 116 can be implemented as hardware, firmware, software, or a combi-nation of such. System memory 116 further includes an operating system (OS) 120. Embodiments provide for the system memory 116 to include application(s) 122. In various implementations, various processes described herein are performed by application(s) 122.

Figure 2:
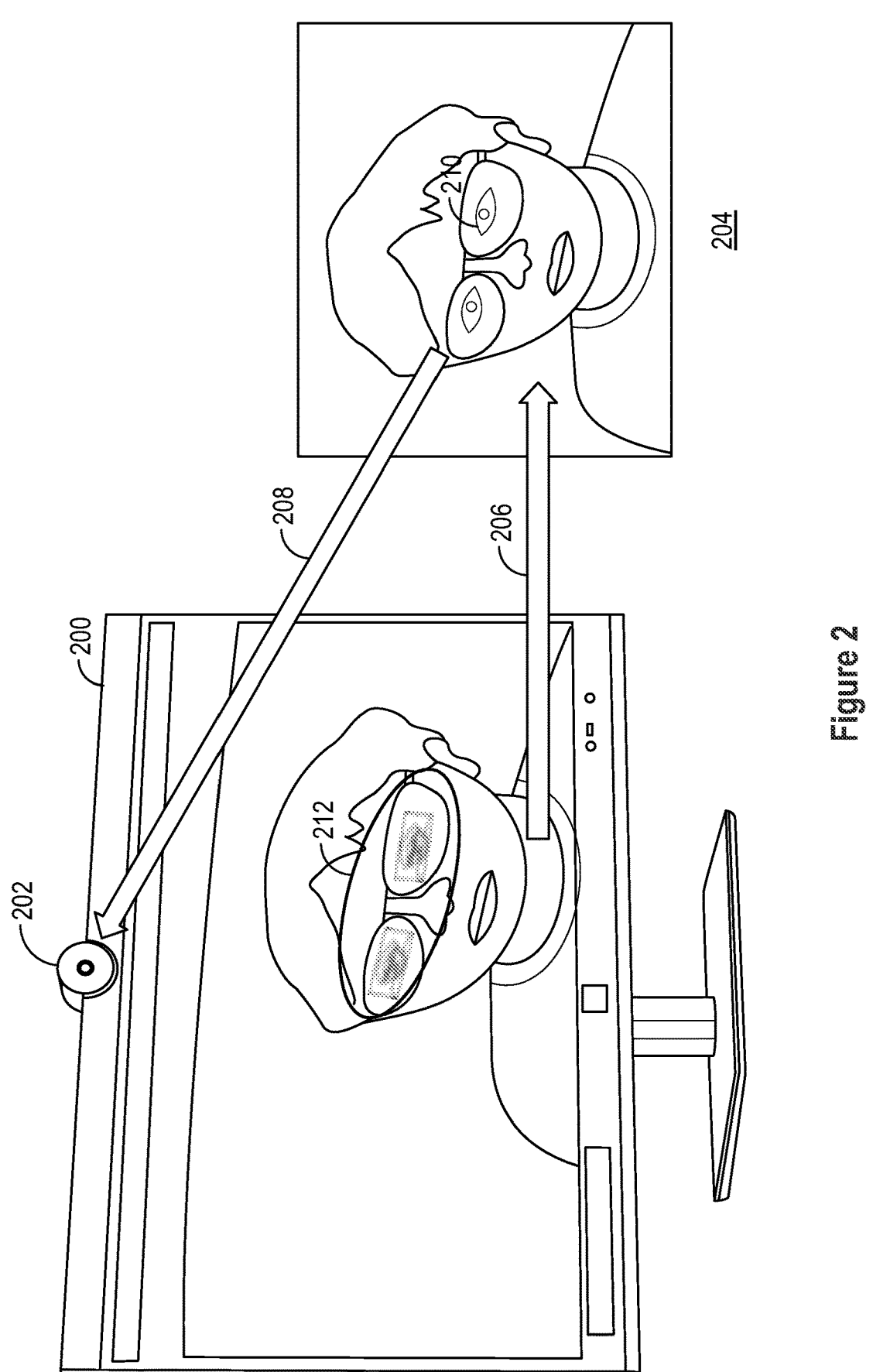
FIG. 2 illustrates reflection from reflected surfaces captured by a camera/webcam.

FIG. 2 illustrates reflection from reflected surfaces cap-tured by a camera/webcam. An IHS, such as described in FIG. 1 can include or be connected to a screen or display (e.g., computer monitor), as part of I/O devices 108. In this example a computer monitor 200 is connected to an IHS. In this example, the computer monitor 200 includes a camera or webcam 202. In certain implementations, the webcam 202 is external to the computer monitor 200. The webcam 202 is included as an I/O device 108 as described in FIG. 1. In certain implementations, the IHS can be a tablet or smartphone, with built in display and camera.

A user 204 is positioned in front of the computer monitor 200. Light 206 is transmitted from the computer monitor 200 and reflected from the user 204. Light 208 including the reflected light from the user 204 is captured by the webcam 202. As further described herein, reflected light from the user 204 includes light from reflected surfaces, such eyewear (lenses) 210. Such light from reflected surfaces is received by the webcam 202 and is reproduced as reflection 212 by computer monitor 200.

Figure 3:
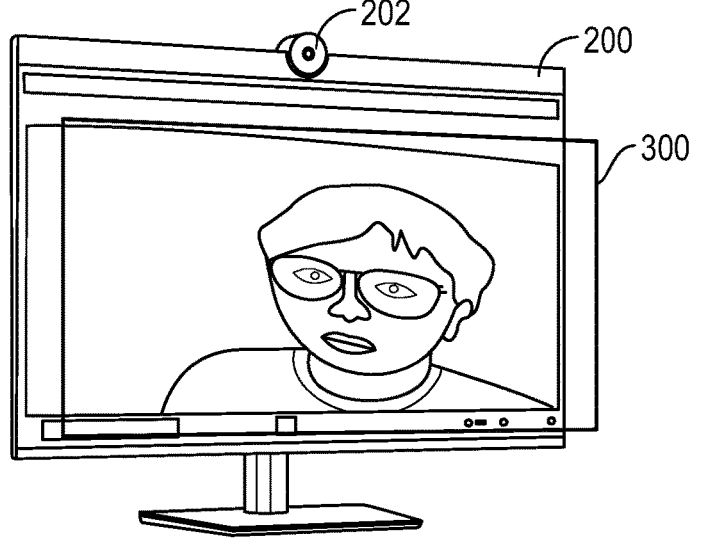
FIG. 3 illustrates a stack-up of layers of display.
Figure 3:
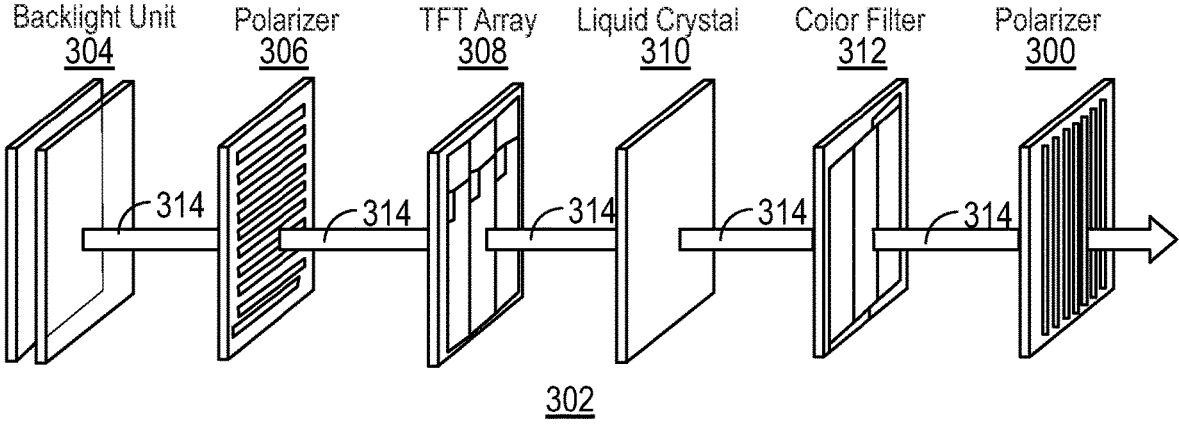

FIG. 3 illustrates a stack-up of layers of display. A screen or display, such as computer 200 described above, can be a liquid crystal display or LCD. Such as display can include a polarizer layer 300 as a top layer of the stack-up of layers.

The stack-up 302 can include a backlight unit (BLU) 304, a polarizer layer 306, and Thin Film Transistor (TFT) array 308, a liquid crystal layer 310, a color filter 312, and the polarizer layer 300. Light 314 is transmitted and processed through the various layers of the stack-up 302.

The polarizer layer 306 is between the BLU 304 and the TFT array 308, where the polarizer layer 300 is placed as a top layer of the stack-up 302. Displays, such as LCD displays implement the polarizer layer 300 due to different pixel designs. Polarizer layer 306 and polarizer layer 300 are stacked 90 degrees or perpendicular to one another. Light that is projected from the display/stack-up 302 is linearly polarized, either vertical or horizontal, since the top layer is a polarizer (e.g., polarizer layer 300).

Figure 4:
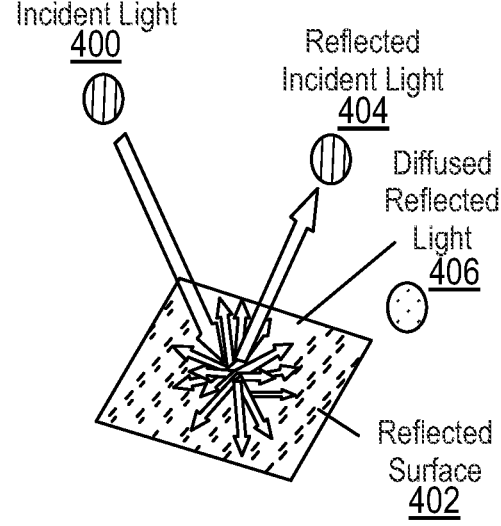
FIG. 4 illustrates reflected linearly polarized light and diffused non-polarized light.
Figure 4:
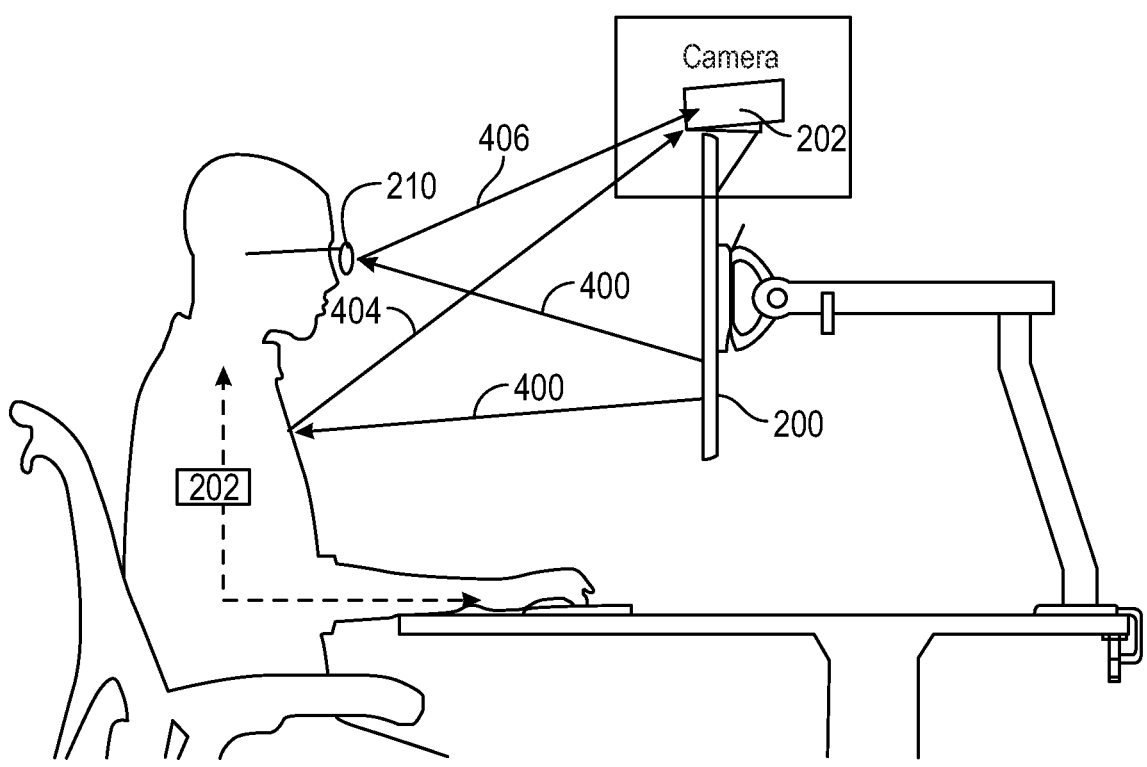

FIG. 4 illustrates reflected linearly polarized light and diffused non-polarized light. As described in FIG. 3 a display can project light that is linearly polarized due to a top layer that is polarized (e.g., polarizer layer). This linearly polar-ized light is represented as transmitted light 314. The linearly polarized light projected from the display is shown as an incident light 400. The incident light 400 can be reflected from a reflective surface 402, such as eyewear 210 of as user 204. The reflected light from reflective surface 402 (e.g., smooth/polished/mirrored surface) is represented as reflected incident light 404. The incident light can also be diffused, and is represented as diffused reflective light 406.

When linearly polarized light, such as incident light 400 from a display is reflected back by reflective surface 402, the reflected incident light 404 is still linearly polarized as captured by the camera 202. The camera 202 receives the linearly polarized reflected incident light 404, and reflection is processed and seen on the display 200. Incident light 400 that is diffused to unpolarized light is received by the camera as diffused reflective light 406. No reflection is processed from the diffused reflective light 406.

Figure 5:
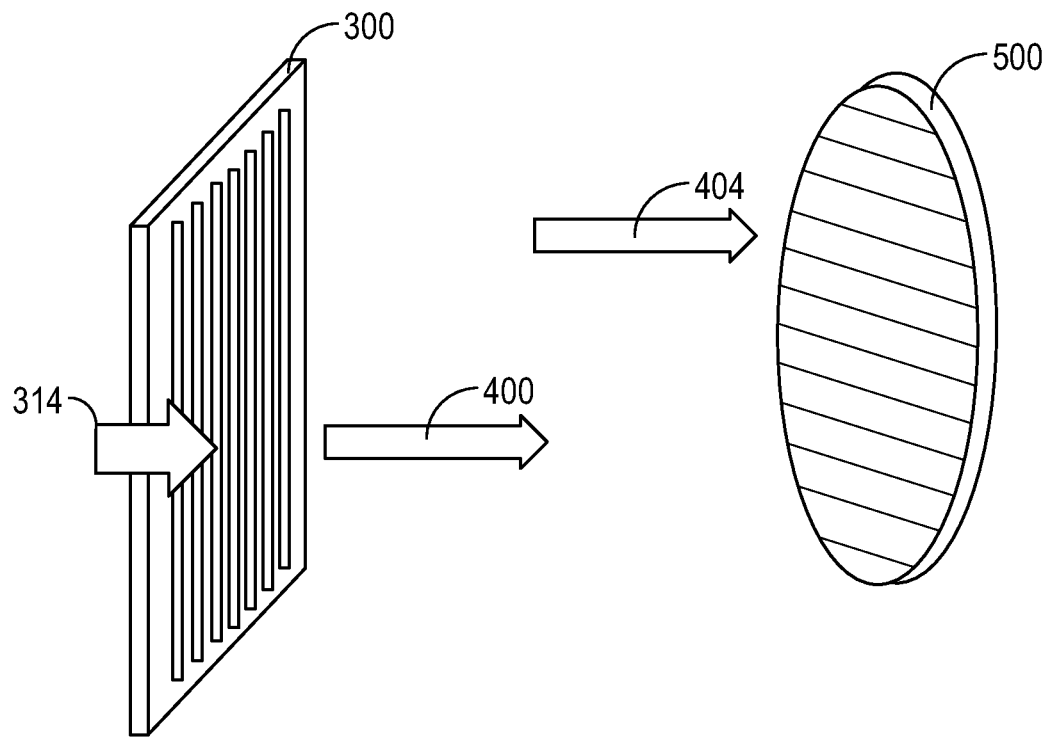
FIG. 5 illustrates a polarizer that receives linearly polarized light.

FIG. 5 illustrates a polarizer that receives linearly polar-ized light. As discussed above, a display can include a polarizer layer 300 that is a top layer of a stack-up 302. The light 314 from the display/polarizer layer 300 is projected from the display as incident light 400. The incident light 400 can be reflected off a reflective surface, such a reflective surface 402 or from a non-reflective surface.

A camera, such as camera 202 receives reflected incident light 404 that is linearly polarized and diffused reflective light that is not polarized.

In various embodiments, a polarizer 500 is placed in front of a lens of a camera, such as webcam 202. The polarizer 500 is positioned 90 degrees or perpendicular to the polar-izer layer 300. This filters out or cancel the linearly polarized reflected incident light 404.

Implementations, as further discussed herein, provide for a polarized film to be placed on top of the lens, or the use of a polarizer filter to be attached to the camera (e.g., webcam 202). The polarizer 500 is positioned 90 degrees or perpendicular to the polarizer layer 300.

Figure 6:
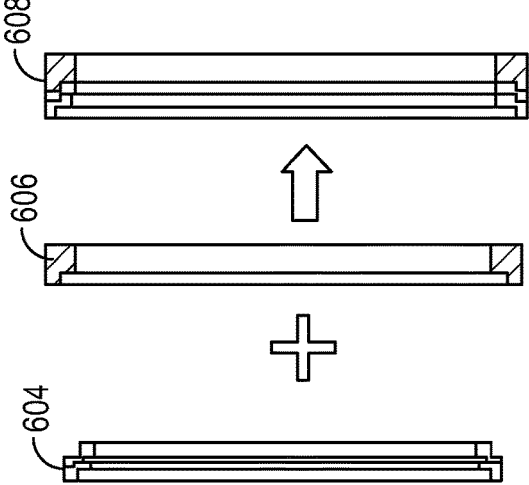
FIG. 6 illustrates a polarizers on cameras to filter out or cancel reflected linearly polarized light.

FIG. 6 illustrates a polarizer on cameras to filter out or cancel reflected linearly polarized light. In certain embodi-ments, the polarizer 500 described in FIG. 5 is implemented as a polarizing film. For example, a lens 600 of webcam 202 (cross sectional view) receives light. The webcam 202 includes a static polarizing film 602 as a layer placed in front of the lens 600. Such implementations can be used when the webcam 202 is part of a display. Since the polarization of light 314 projected from the display is known, a built-in webcam 202 can have a static polarized film 602 that is perpendicular, as described in FIG. 5, to the known polar-ization of light 314. The static polarized film 602 receives linearly polarized reflected incident light 404 and diffuses the polarity to eliminate reflection that would be seen on the display. The static polarized film 602 can also receive diffused reflective light that is not polarized or scattered light without affecting image quality.

Certain embodiments provide for the use of a rotatable polarizer. As discussed in FIG. 5, polarizer 500 is positioned 90 degrees or perpendicular to the polarizer layer 300. In certain implementations, such as when an external camera or webcam 202 is used, position of the camera may be uncertain, and polarization of the polarizer 500 in relation to the polarizer layer 300 is undetermined. Therefore, an adjustable rotatable polarizer is provided in front to the lens 600 of webcam 202. The adjustable rotatable polarizer is adjusted to align 90 degrees or perpendicular to the polarizing layer 300.

In certain implementations, a rotating polarized filter 604 is provided. The rotating polarized filter 604 can be fitted to a metal ring 606. The rotating polarized filter 604 and metal ring 606 are implemented as an assembly 608. The assembly 608 is fitted onto the front of the webcam 202 (lens 600).

In use, the rotating polarized filter 604 can be rotated or aligned such that the polarity of the rotating polarized filter 604 becomes 90 degrees or perpendicular to the polarizing layer 300. The rotating polarized filter 604 is positioned accordingly when no reflection is shown on the display.

The use of a polarizer, such as static polarized film 602 or rotating polarized filter 604 can also eliminate flicker on highly sensitive cameras, such as used by smartphones (e.g., iPhones). When pointed towards a strong light sources (e.g., outdoor lighting) from an indoor environment (e.g., fluorescent indoor light), the camera sets a relatively high shutter speed to compensate for strong (bright) light source. The adjusted shutter speed in faster than the frequency of the indoor environment source (e.g., fluorescent indoor light, which is 60 Hz/50 Hz), would result in an observed flicker. The polarizing layer (e.g., static polarized film 602 or rotating polarized filter 604) addresses flicker by doubling the exposure time of the camera.

Figure 7:
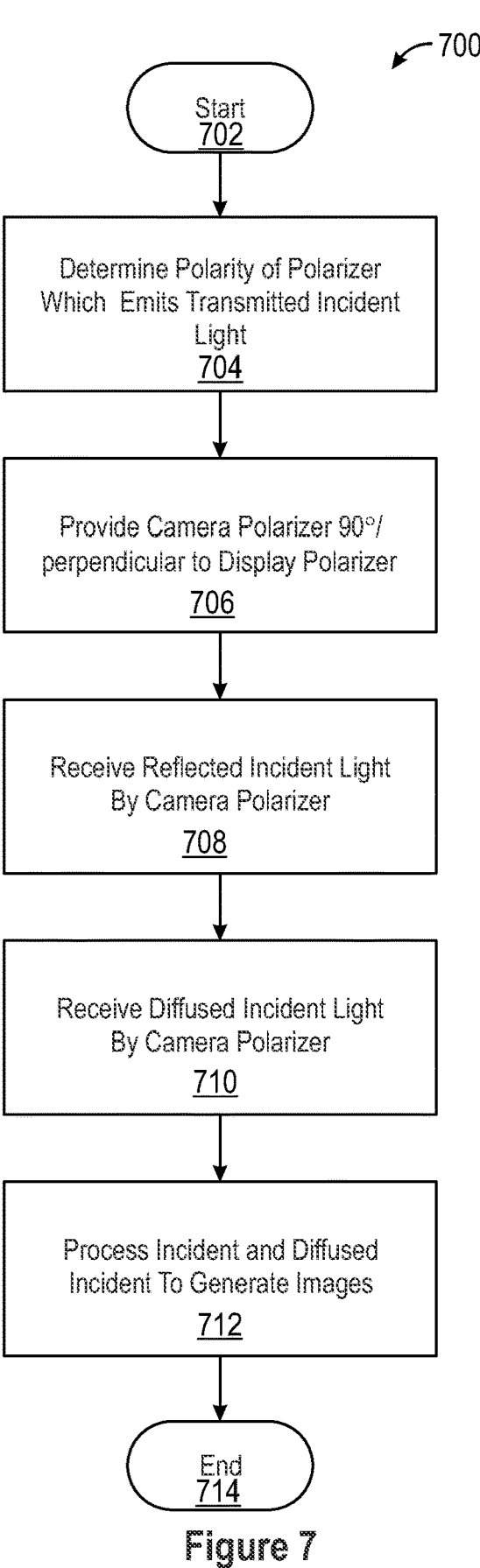
FIG. 7 is a generalized flowchart for eliminating reflection from incident light captured by cameras.

FIG. 7 is a generalized flowchart for eliminating reflection from incident light captured by cameras. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. In certain implementations, the application(s) 122 described in FIG. 1 can be used to perform steps of the described method/process.

At step 702, the process 700 starts. At step 704, a determination is performed as to the polarity of the polarizer (e.g., polarizer layer 300) which polarizes transmitted light from a display. The transmitted light being linearly polarized light.

At step 706, a polarizer is provided at the front of a camera (e.g., webcam 202), and specifically in the front of a lens (e.g., lens 600) of the camera. The camera polarizer is positioned 90 degrees or perpendicular to the polarity of the display polarizer. The camera polarizer can be static (polarized film 602) or adjustable/rotatable (e.g., rotating polarized filter 604).

At step 708, the camera and specifically the camera polarizer (e.g., polarized film 602, rotating polarized filter 604) receives reflected incident light (e.g., linearly polarized reflected incident light 404), and filter out or cancel the reflected incident light.

At step 710, the camera and specifically the camera polarizer (e.g., polarized film 602, rotating polarized filter 604) receives diffused incident light (e.g., diffused reflective light 406).

At step 712, received reflected incident light (e.g., linearly polarized reflected incident light 404) and received diffused incident light (e.g., diffused non-polarized light 406) are processed to generate images on the display. At step 714, the process 0700 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram step or steps.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. An information handling system (IHS) comprising:
a display that includes a stack-up of layers, wherein a top layer is a polarizer from which linearly polarized light is transmitted from the display, wherein the transmitted linearly polarized light is reflected as incident light back to the display;
a camera that receives incident light, including linearly polarized light, from the light transmitted from the display, and
a polarizer in front of the camera that is 90 degrees or perpendicular in polarity of the polarizer of the display, which polarizes the incident transmitted linearly polarized light from the display and receives transmitted and linearly polarized and diffused incident light, wherein incident transmitted linearly polarized light and diffused non-polarized incident light are processed to generate images on the display.

2. The IHS of claim 1, wherein the IHS is one of a desktop computer, laptop computer, tablet computer, or smartphone.

3. The IHS of claim 1, wherein the display is a liquid crystal display.

4. The IHS of claim 1, wherein the camera is a webcam.

5. The IHS of claim 1, wherein the polarizer of the camera is static polarizing film that is placed in front of a lens of the camera.

6. The IHS of claim 1, wherein the polarizer of the camera is an adjustable rotating polarizer that is adjusted to be 90 degrees or perpendicular in polarity to the polarizer of the display.

7. The IHS of claim 6, wherein the adjustable rotating polarizer is an assembly that is attached to the camera.

8. A camera connected to an information handling system (IHS) comprising:
a lens;
a polarizer placed in front of the lens to receive incident light transmitted from a display that includes linearly polarized light, wherein the display that comprises a top layer polarizer from which the light is linearly polarized, wherein the polarizer is 90 degrees or perpendicular in polarity to the top layer polarizer, the polarizer cancels the received incident linearly polarized light, wherein the polarizer in front of the lens polarizes the incident transmitted linearly polarized light from the display and receives transmitted and linearly polarized and diffused incident light, wherein incident transmitted linearly polarized light and diffused non-polarized incident light are processed to generate images on the display.

9. The camera of claim 8, wherein the IHS is one of a desktop computer, laptop computer, tablet computer, or smartphone.

10. The camera of claim 8, wherein the display is a liquid crystal display that comprises a stack-up of layers that includes the top layer polarizer.

11. The camera of claim 8, wherein the camera is a webcam.

12. The camera of claim 8, wherein the polarizer is static polarizing film that is placed in front of the lens of the camera.

13. The camera of claim 8, wherein the polarizer is an adjustable rotating polarizer that is adjusted to be 90 degrees or perpendicular in polarity to top layer polarizer of the display.

14. The camera of claim 13, wherein the adjustable rotating polarizer is an assembly that is attached to the camera.

15. A computer-implementable method for eliminating reflection from incident light captured by an information handling system (IHS) camera comprising:
determining polarity of a polarizer which polarizes incident transmitted linearly polarized light from a display connected to the IHS;
providing a polarizer in front of the camera that is 90 degrees or perpendicular to the polarity of the polarizer which polarizes the incident transmitted linearly polarized light from the display;
receiving by the polarizer in front of the camera, the incident transmitted linearly polarized light and diffused incident light; and
processing the incident transmitted linearly polarized light and diffused non-polarized incident light to generate images on the display.

16. The computer-implementable method of claim 15, wherein the IHS is one of a desktop computer, laptop computer, tablet computer, or smartphone.

17. The computer-implementable method of claim 15, wherein the display includes stack-up layers and the polarizer which polarizes transmitted light is a top layer.

18. The computer-implementable method of claim 15, wherein the polarizer in front of the camera is static polarizing film place in front of a lens of the camera.

19. The computer-implementable method of claim 15, wherein the polarizer in front of the camera is an adjustable rotating polarizer that is adjusted to be 90 degrees or perpendicular in polarity to top layer polarizer of the display.

20. The computer-implementable method of claim 19, wherein the adjustable rotating polarizer is an assembly attached to the camera.

* * * * *